United States Patent Office 3,008,899
Patented Nov. 14, 1961

3,008,899
FORMOLITE RESIN-EPOXY RESIN GREASE COMPOSITIONS
Judson E. Goodrich, San Rafael, Calif., assignor to California Research Corporation, San Francisco, Calif., a corporation of Delaware
No Drawing. Filed Dec. 2, 1959, Ser. No. 856,672
15 Claims. (Cl. 252—32)

This invention pertains to lubricating grease compositions which are particularly useful under extreme pressure, more particularly to grease compositions wherein oils of lubricating viscosity are thickened to grease consistency by the use of certain resins.

This application is a continuation-in-part of patent application Serial No. 783,137, filed December 29, 1958.

It is becoming more and more prevalent in the grease art to blend grease compositions which can be used for more than one purpose; that is, to form grease compositions wherein the usefulness thereof has been extended beyond that of grease compositions of the prior art. As a consequence of the rapid increase in the severity of operating conditions within industry, there is becoming an even greater demand for industrial grease compositions which are effective for the lubrication of wearing surfaces at high temperatures and under extremely heavy loads, that is, under extreme pressures. Thus, the load carrying capacity demanded of metal wearing surfaces is constantly being increased with the ever advancing developments in the industrial fields, particularly those in the heavy industries.

Steel mill operations, particularly those which are used for the rolling of metals, require grease compositions having high melting points and high extreme pressure characteristics. One such operation in a steel mill involves the transformation of steel ingots into rods or sheets by passing the hot metal through the roll mill assemblies for the purpose of reducing the cross-sectional area of the hot metal. The rolls through which the hot metal must pass are supported by bearings which are known in the industry as "roll-neck bearings." As is well known, it is an extremely expensive operation to shut down a mill for the replacement of such bearings, particularly where the bearings fail, due to failure of lubrication. Therefore, it is a prime requisite in roll mill operations that the lubricants withstand the effects of heavy duty service and proper lubrication at all times to prevent lubricating failures.

A primary factor to consider in the lubrication of anti-friction "roll-neck bearings" is the extreme load to which the roll necks must be subjected when hot metals are passing through the rolls. As the pressures under which the roll neck bearings operate increase, there is a proportionate increase in the temperatures of those bearings. Such high temperatures and extreme pressures often cause a breakdown of the prior art grease compositions; for example, those greases which are thickened with a metal soap of a fatty acid, e.g., calcium hydroxy stearate.

The normally used grease thickening agents, because they do not support such extreme pressure loads, require as a further additive, various E.P. agents (i.e., extreme pressure agents), which agents are normally corrosive to metal surfaces. These metal-corrosive E.P. agents include the phosphorous, sulfur, and chlorine-containing additives, such as the esters of acids of phosphorus, sulfurized olefins, sulfurized aromatic compounds, chlorinated hydrocarbons, etc. In addition to the aforenamed E.P. agents, lead soaps (e.g., lead soaps of castor oils) are used as E.P. additives.

Such E.P. additives not only are corrosive to metal wear surfaces, but cause changes in the characteristics of grease compositions. For example, the E.P. additives cause changes in consistency, dropping points, bleeding characteristics, etc., of the greases. Also, although some E.P. additives assist grease compositions to pass required film strength tests immediately after the preparation of the grease, such additives actually cause a marked decrease in the film strength after relatively short periods of grease storage.

Thus, whereas it was heretofore necessary to use a particular grease for each particular operating part of industrial machinery, it is becoming more and more desirable to use one grease which can be used throughout a whole plant area. As set forth hereinabove, although numerous grease compositions of the prior art are useful as multi-purpose grease compositions, they are useful only to a limited degree; primarily, because the known grease compositions lack high film strength. It is of particular importance in the operation of modern industrial equipment, as well as current automobiles and airplanes, to use one grease composition which will suffice throughout all applications.

The grease compositions described herein can be used for numerous purposes; such grease compositions are particularly useful in steel mill motors, steel mill transfer cable bearings, steel mill roller bearings, paper mill roller bearings, nuclear reactors, automotive wheel bearings, bearings of amphibious military vehicles, high temperature cannery equipment, exposed control surface bearings for aircraft, etc.

Therefore, it is a primary object of this invention to provide grease compositions characterized by high melting points and high extreme pressure characterisics, which grease compositions are relatively non-corrosive to metal working surfaces.

In accordance with this invention, it has been discovered that high melting point, high extreme pressure grease compositions are obtained by the use of the combination of epoxy resins with certain particular infusible resins as grease thickening agents. In particular, this invention pertains to grease compositions obtained by thickening oils of lubricating viscosity with epoxy resins in combination with infusible resins of relatively high molecular weight; that is, infusible resins which are obtained by reacting formaldehyde with aromatic compounds in the presence of acid catalysts, forming certain particular formolite resins.

Formolite resins of themselves thicken lubricating oils to form grease compositions having good extreme pressure characteristics. However, the presence of epoxy resins enhances the extreme pressure characteristics of formolite resin thickened greases. Furthermore, in addition to their high extreme pressure characteristics, the grease compositions herein are characterized as being extremely resistant to emulsification in water.

The infusible formolite resins used herein are condensation products obtained by reacting an aromatic hydrocarbon with formaldehyde in the presence of an acid catalyst.

The aromatic hydrocarbons used in the formation of the grease thickening agents herein are aromatic hydrocarbons containing a benzene ring. Aromatic hydrocarbons particularly preferred are alkyl substituted benzene compounds containing no more than 2 alkyl radicals substituted on the benzene ring, each alkyl radical containing no more than 6 carbon atoms.

Included as aromatic hydrocarbons are those represented by the formula

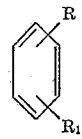

wherein R can be hydrogen or an alkyl radical containing no more than 6 carbon atoms, and $R_1$ can be hydrogen, an alkyl radical containing no more than 6 carbon atoms, a phenyl radical, or an alkylphenyl radical wherein the alkyl radical contains no more than 6 carbon atoms.

Aromatic hydrocarbon reactants are exemplified by benzene, n-butylbenzene, toluene, o-xylene, m-xylene, p-xylene, toluene, biphenyl, cumene, p-cymene, phenanthrene, aromatic petroleum fractions, etc.

Formaldehyde may be used as a reactant, as well as compounds which yield formaldehyde under the conditions of the reaction, including paraformaldehyde, methylal, alpha-trioxymethylene, and metaformaldehyde, etc.

The acid catalysts include sulfuric acid, hydrofluoric acid, etc.

The reaction of formaldehyde with aromatic hydrocarbons in the presence of acid catalysts is well described in the literature. However, the literature states that the products obtained by such reactions include diphenyl methane, and two types of resinous products. One of the resin products is a high melting essentially oxygen free resin soluble in most organic solvents (melting at about 200° F.) The other resin product is an infusible resin insoluble in all common solvents, and containing a significant amount of oxygen. The literature describes both of these latter resins as formolite resins; however, the grease thickening agent described in this invention is derived from this latter infusible resin insoluble in all common solvents.

Thus, as used herein, the term "infusible resin" means the products obtained as an infusible resin insoluble in all common solvents and containing significant amounts of oxygen, which resin is obtained by reacting an aromatic hydrocarbon described hereinabove with a formaldehyde producing compound in the presence of an acid catalyst.

Although not intended to be bound thereby, it has been postulated that these infusible resins have the following formula:

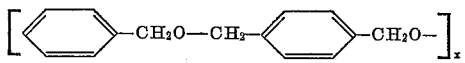

wherein $x$ is a number indicative of the molecular weight of these resins. Although this formula indicates a linear polymeric compound, these polymers are also crosslinked.

This postulated structure is supported by infra red analysis of the resin obtained. Infra red analyses show the presence of ether linkages and highly substituted aromatic radicals.

The epoxy resins used herein are characterized as being of the Bisphenol A type; that is, the particular epoxy resins herein have the general formula:

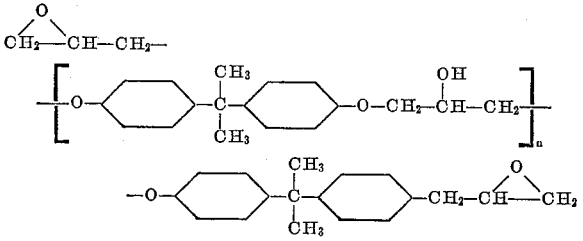

wherein $n$ is aumber from 0 to 10.

For the purposes of this invention, the epoxy resins have (1) molecular weights from about 350 to about 3,000; preferably, from about 350 to about 1,000; and (2) epoxide equivalents of about 175 to about 2,000.

The term "epoxide equivalent" is defined as the weight of resin in grams which contain 1 gram chemical equivalent of epoxy.

As will be described in further detail in the examples hereinbelow, the epoxy resins are dispersed in the lubricating oils, followed by the addition thereto of hardening agents. Although the hardening agent itself is not a grease thickening agent, it is necessary to transform the epoxy resins from a liquid (or thermoplastic) state to a solid state.

There are numerous types of hardening agents. However, for the purpose of this invention, a polyamine diethylene triamine was used. Subsequent to the curing (hardening) of the epoxy resin, any remaining amine is not an essential part of the thickening agent for the grease compositions herein.

Lubricating oils which are suitable herein as base oils for the compositions of this invention include a wide variety of lubricating oils, such as naphthenic base, paraffin base and mixed base, other hydrocarbon lubricants, e.g., lubricating oils derived from coal products, and synthetic oils, e.g., alkylene polymers (such as polymers of propylene, butylene, etc., and mixture thereof), alkylene oxide-type polymers, dicarboxylic acid esters, liquid esters of acids of phosphorus, numerous alkyl benzenes, polymers of silicon, polyphenyls (e.g., biphenyls and terephenyls), alkyl biphenyl ethers, etc.

Synthetic oils of the alkylene oxide-type polymers which may be used include those exemplified by the alkylene oxide polymers (e.g., propylene oxide polymers) and derivatives, including alkylene oxide polymers prepared by polymerizing the alkylene oxide, e.g., propylene oxide in the presence of water or alcohols, e.g., ethyl alcohol, esters of ethylene oxide-type polymers, e.g., acetylated ethylene oxide polymers prepared by acetylating ethylene oxide polymers containing hydroxyl groups; polyethers prepared from ethylene glycols, e.g., ethylene glycol, etc.

Synthetic oils of the dicarboxylic acid ester type include those which are prepared by esterifying such dicarboxylic acids as adipic acid, azelaic acid, suberic acid, sebacic acid, alkanol succinic acid, fumaric acid, maleic acid, etc., with alcohols such as butyl alcohol, hexyl alcohol, 2-ethylhexyl alcohol, dodecyl alcohol, etc. Examples of dibasic (dicarboxylic) acid ester synthetic oils include dibutyl adipate, dihexyl adipate, di-2-ethylhexyl sebacate, and di-N-hexyl fumaric polymer.

Synthetic oils of the alkyl benzene type include those which are prepared by alkylating benzene (e.g., dodecyl benzene, tetradecyl benzene, etc.).

Synthetic oils of the types of polymers of silicon include the liquid esters of silicon and the polysiloxanes, which include those exemplified by tetraethyl silicate, tetraisopropyl silicate, tetra(4-methyl-2-penta) silicate, poly(methyl) siloxane, poly(methylphenyl) siloxane, etc.

The above base oils may be used individually as such, or in various combinations, wherever miscible or wherever made so by the use of mutual solvents.

As grease thickening agents, the infusible formolite resins described herein are incorporated in oils of lubricating viscosity in amounts sufficient to thicken the oils to the consistency of a grease including amount of 5% to 50%, by weight; more preferably, 10% to 30%, by weight.

The epoxy resins are incorporated in the formolite thickened grease compositions in amounts sufficient to enhance the extreme pressure characteristics thereof; more specifically, amounts of 1.5% to 15%, preferably from 3% to 8%.

The weight ratio of formolite resin to epoxy resin is from 20:1 to 5:1, preferably 10:1 to 5:1.

In the preparation of the infusible resins which are used as grease thickening agents according to this invention, it is preferred to form a blend of the acid catalyst and the aromatic hydrocarbon, then slowly add the formaldehyde (or formaldehyde-producing component) to this blend, avoiding at all times a high concentration of formaldehyde in the presence of the acid.

The mol ratio of aromatic hydrocarbon to formaldehyde may have values from 0.5 to about 4, preferably from 0.5 to about 1.

The reaction temperatures may vary, for example, from approximately 55° F. to about 173° F. It is preferred that the reaction temperatures be no more than 173° F. Since the yield of the desired produce decreases with increased temperature, it is still further preferred that the temperature be in the lower range (e.g. 35° F. to 55° F.)

As a solvent for the reaction in the formation of the infusible resin, there may be used carbon tetrachloride, numerous hydrocarbon petroleum thinners, etc.

The following examples describe the preparations of various infusible resins useful herein as grease thickening agents. Although the resin itself is a grease thickening agent, other grease thickening agents, such as the normal soaps of fatty acids (e.g., sodium stearate) may be used in combination with the resins described herein. When used in combination herein, the secondary thickening agents such as the metal soaps of fatty acids are present in minor amounts, that is, amounts insufficient to thicken the lubricating oils to the consistency of greases.

EXAMPLE I

*Preparation of an infusible resin from benzene and formaldehyde*

A mixture of 640 ml. of carbon tetrachloride, 94 ml. (1.06 mol) of benzene, 373 ml. of 98% sulfuric acid, and 8 ml. of a 25% concentrate of a dispersant (1) in carbon tetrachloride was blended in a 1500 ml. glass turbomixer. After the mixture had been thoroughly blended together, the mixture was cooled to 35° F. in an ice-salt bath, after which 117 ml. (1.65 mols) of 38% aqueous formaldehyde was added dropwise with vigorous agitating over a period of about one hour. During this reaction time, the temperature rose to about 55° F. The resulting slurry was poured into cold acetone, filtered, and washed several times with fresh acetone. The resulting product was a dark filter cake, which was placed in a beaker, agitated with fresh water, and to which was added 80% solution of ammonium hydroxide. The product turned bright yellow in color. The slurry was filtered, washed once with fresh water, twice with acetone, and twice with hexane. The final product was a light yellow powder (84.2 grams).

(1) The dispersant was a copolymer of lauryl methacrylate and maleic anhydride and having a molecular weight of about 100,000.

EXAMPLE II

*Preparation of a grease from a resin obtained by reaction of benzene with formaldehyde*

A mixture of 114.5 grams of a California solvent refined naphthalenic base oil having a viscosity of 450 at 100° F. and 5.3 grams (0.019 equivalent) of a stearic acid was heated to a temperature of 150° F. To this mixture was added 20 grams of the resin of Example I hereinabove, followed by an aqueous slurry of 2.8 grams (0.076 equivalent) of calcium hydroxide in 20 ml. water. The mixture was agitated vigorously and heated to a temperature of about 360° F., after which it was pan cooled, and passed through a Manton Gaulin homogenizer at 5,000 pounds pressure. The resulting grease was a smooth, brown grease having an ASTM worked penetration ($P_{60}$) of 285 and an ASTM dropping point in excess of 580° F.

The particular particle size of the formolite resin is critical to the success of its use as a grease thickening agent. When used as described herein, it is preferred that the average particle size of the dispersed resin be no more than 0.1 micron.

Table I hereinbelow presents data obtained with grease compositions thickened by formolite resins, described herein, varying the aromatic portion of the resin. The resins were prepared as described in Example I hereinabove, using sulfuric acid as the catalyst. Carbon tetrachloride was used as the solvent. The greases were prepared as described in Example II hereinabove.

TABLE I

| Aromatic Used (Amounts, ml.) | Source of Formaldehyde (Amounts, ml.) | | Amounts $H_2SO_4$ (98%) (ml.) | Grease Characteristics | |
|---|---|---|---|---|---|
| | Formalin | Methylal | | $P_{60}$ (ASTM) | Dropping Pt. (° F.) |
| Benzene (94) | 117 | | 373 | 295 | 580+ |
| Biphenyl (75) | 104 | | 332 | 361 | 532 |
| Toluene (94) | 117 | | 373 | 336 | 580+ |
| o-Xylene (94) | 117 | | 373 | 307 | 580+ |
| m-Xylene (94) | | 130 | 373 | 387 | 248 |
| p-Xylene (94) | | 130 | 373 | 260 | 495 |
| n-Butylbenzene (94) | | 130 | 373 | 343 | 230 |
| Cumene (90) | | 130 | 373 | 502 | |
| p-Cymene (84) | | 115 | 332 | 452 | |
| Phenanthrene (71 grams): | | 115 | 332 | 477 | |
| A—(94) | 117 | | 373 | 460 | 200 |
| B—(94) | 117 | | 373 | 358 | 580+ |
| C—(94) | 117 | | 373 | 448 | 224 |

(A) A petroleum hydrocarbon fraction containing 90% aromatics and having a boiling point range of 275° F. to 336° F.
(B) A petroleum hydrocarbon fraction described as a catalytic reformer bottoms having a boiling point range of 326° F. to 580+° F.
(C) An aromatic petroleum hydrocarbon fraction having a boiling point range of 300° F. to 550° F., and derived from a catalytically cracked gas oil fraction.

Table II hereinbelow presents further data obtained with grease compositions of this invention. The resins in each case were benzene formaldehyde resins prepared as described in Example I hereinabove, and the greases were prepared by the process of Example II hereinabove.

The base oils are described as follows:

Base oil A was di(2-ethylhexyl) sebacate;
Base oil B was a poly(phenylmethyl siloxane);
Base oil C was a California paraffinic base oil having a viscosity of 480 SSU at 100° F.; and
Base oil D was a California naphthenic base oil having a viscosity of 450 SSU at 100° F.

The "bearing life" for a particular grease composition was determined by the following test procedure which is known as the Navy High Speed Bearing Test, also known as Federal Standard No. 791, Test Method 331. In the test, a ball bearing packed with a grease was operated at 10,000 r.p.m. continuously for 22 hours at the noted temperature with a 5 pound axial load, and 3 pound radial load. The apparatus was then cooled to room temperature during a period of two hours. This procedure of operation at 10,000 r.p.m. at the noted temperature and cooling was repeated until there was bearing failure. The number of hours in the table is the number of hours prior to bearing failure.

The numbers in Table II for the composition refer to the amounts of components as weight percent.

TABLE II

| Grease Composition | 1 | 2 | 3 | 4 | 5 | 6 |
|---|---|---|---|---|---|---|
| Resin | 17.5 | 15.5 | 17.0 | 12.3 | 18.5 | 19.7 |
| Calcium Stearate | 4.0 | 6.0 | 6.0 | 4.5 | 4.5 | 4.5 |
| Inhibitor (Dilauryl Selenide) | | | 4.7 | | | |
| Base Oil A | 78.5 | | | | | |
| Base Oil B | | 78.5 | | | | |
| Base Oil C | | | 72.3 | | | |
| Base Oil D | | | | 83.2 | 77.0 | 75.8 |
| Grease Characteristics: | | | | | | |
| $P_{60}$ (ASTM) | 237 | 311 | 288 | 387 | 250 | 309 |
| Dropping Point, ° F. | 580+ | 580+ | 580+ | 250 | 580+ | 580+ |
| Bearing Life, 300° F., Hours | 78 | 72 | 206 | | | |

Example III hereinbelow illustrates the preparation of infusible formolite resin thickened greases having epoxy resins incorporated therein.

The epoxy resin used in this preparation was a bisphenol A type having an epoxide equivalent of 175–210 and an average molecular weight of 350–400, which resin is sold as "Epon 828" by the Shell Chemical Company.

EXAMPLE III

A mixture of approximately 750 grams of a California base mineral oil having a viscosity of 450 SSU at 100° F., 372 grams of a formolite resin prepared as in Example I hereinabove, and 1750 grams of acetone was heated with agitation to 150° F., after which 109 grams of the above-identified epoxy resin was added. After the acetone had been removed by distillation at 200° F., 4.0 grams of Ca(OH)$_2$ in a water slurry was added. The whole mixture was heated to 250° F. to remove the water, after which 12.6 grams of diethyltriamine (a hardener) was added; then heated to 400° F., followed by pan cooling. After milling through an extrusion mill at 5000 p.s.i., the resulting grease had an ASTM Worked Penetration (P$_{60}$) value of 263.

The data of Table III hereinbelow illustrate further the preparation of formolite resin-thickened greases containing epoxy resins. In the composition, the numbers refer to percent by weight of components present.

The base oil was a California base oil having a viscosity of 480 SSU at 100° F.

The Mean Hertz Load Test measures the load carrying capacity of the grease. A Shell 4-ball tester is used, and the weight noted in the data is the load at which welding occurred.

The formolite resins were prepared as in Example I hereinabove.

TABLE III

| | 1 | 2 | 3 | 4 | 5 | 6 | 7 |
|---|---|---|---|---|---|---|---|
| Composition: | | | | | | | |
| Formolite Resin | 22.0 | 12.9 | 16.0 | 14.0 | 16.0 | 14.0 | 12.0 |
| Epoxy Resin [1] | 0.0 | 12.9 | 6.0 | 8.0 | 1.8 | 3.6 | 5.4 |
| Hardener [2] | 0.0 | 1.5 | 0.7 | 1.0 | 0.2 | 0.4 | 0.6 |
| Ca(OH)$_2$ | 0.0 | 0.0 | 0.0 | 0.0 | 1.0 | 1.0 | 1.0 |
| Base Oil | 78.0 | 72.7 | 77.3 | 77.0 | 81.0 | 81.0 | 81.0 |
| Test Results: | | | | | | | |
| ASTM Worked Penetration (P$_{60}$) | 276 | 263 | 265 | 254 | 290 | 303 | 311 |
| Mean Hertz Load (Kgs.) | 58 | | 61 | 66 | | | |

[1] "Epon 828".
[2] Diethylenetriamine.

Because there is present a slight amount of surface acidity on the infusible resin (which acidity results from the catalyst used), it is desirable to incorporate a slight amount of base (e.g., calcium hydroxide) in the infusible resin thickened grease composition. However, the infusible resin thickens lubricating oils to grease consistency in the absence of this base.

In addition to the components described hereinabove, the grease compositions of this invention may have incorporated therein dispersants such as metal sulfonates, oil soluble non-ionic detergents, polymeric detergents, cationic-anionic detergents, quaternary alkylamines, alkyl esters of glycerine, etc.; oxidation inhibitors, extreme pressure agents, oiliness agents, coloring agents, corrosion inhibitors, and other agents which of themselves do not thicken oils to form greases but which improve the overall characteristics of greases (e.g., phenoplasts, such as phenol-formaldehyde resins; and aminoplasts, such as melamine-formaldehyde resins), etc.

I claim:

1. A grease composition comprising a major proportion of an oil of lubricating viscosity, from about 5%, by weight, to about 50%, by weight, of a grease thickening agent obtained by reacting 0.5 mol to 4 mols of an aromatic hydrocarbon with a mol of a formaldehyde-producing agent in the presence of an acid catalyst at temperatures from 35° F. to 173° F., and from 1.5% to 15%, by weight, of an epoxy resin of the formula:

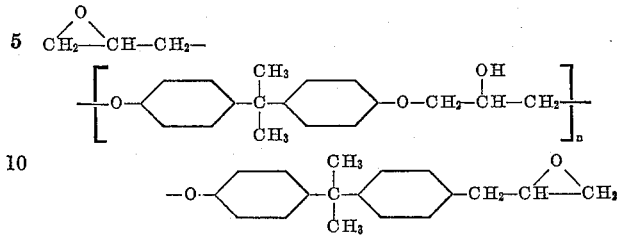

wherein $n$ is a number from 0 to 10.

2. A grease composition comprising a major proportion of an oil of lubricating viscosity, from about 10%, by weight, to about 30%, by weight, of a grease thickening agent obtained by reacting 0.5 mol to 4 mols of an aromatic hydrocarbon with a mol of a formaldehyde-producing agent in the presence of an acid catalyst at temperatures from 35° F. to 173° F., and from 1.5% to 15%, by weight, of an epoxy resin of the formula:

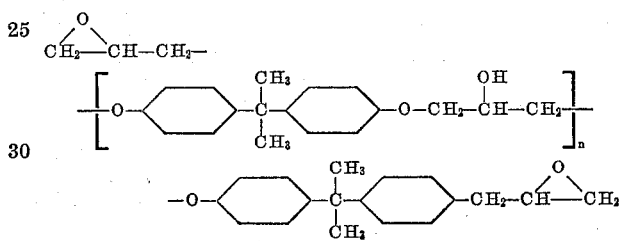

wherein $n$ is a number from 0 to 10.

3. The grease composition of claim 2, wherein said aromatic hydrocarbon is benzene.

4. The grease composition of claim 2, wherein said aromatic hydrocarbon is toluene.

5. The grease composition of claim 2, wherein said aromatic hydrocarbon is a xylene.

6. The grease composition of claim 2, wherein said aromatic hydrocarbon is an alkylbenzene.

7. A grease composition comprising a major proportion of an oil of lubricating viscosity, from about 5% to about 50%, by weight, of a benzene-formaldehyde infusible resin obtained by the reaction of benzene with formaldehyde in the presence of an acid catalyst at temperatures from 35° F. to 173° F., wherein the mol ratio of benzene to formaldehyde has a value from 0.5 to 4, and from 1.5% to 15%, by weight, of an epoxy resin, wherein the weight ratio of infusible resin to epoxy resin is from 20:1 to 5:1, wherein said epoxy resin has the formula:

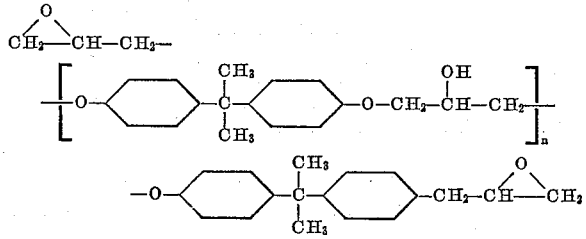

wherein $n$ is a number from 0 to 10.

8. A grease composition comprising a major proportion of an oil of lubricating viscosity, and from about 10% to about 30%, by weight, of a benzene-formaldehyde infusible resin obtained by the reaction of benzene with formaldehyde in the presence of an acid catalyst at temperatures from 35° F. to 173° F., wherein the mol ratio of benzene to formaldehyde has a value from 0.5 to 4, and from 1.5% to 15%, by weight, of an epoxy resin, wherein the weight ratio of infusible resin to epoxy resin is from 20:1 to 5:1, wherein said epoxy resin has the formula:

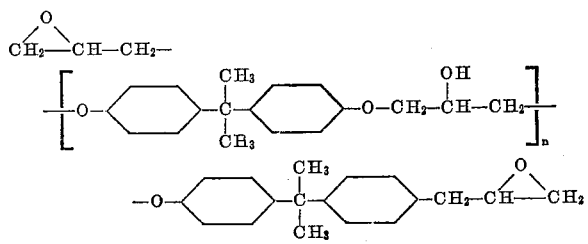

wherein n is a number from 0 to 10.

9. A grease composition comprising a major proportion of an oil of lubricating viscosity, from about 10% to about 30%, by weight, of a benzene-formaldehyde infusible resin obtained by the reaction of benzene with formaldehyde in the presence of an acid catalyst at temperatures from 35° F. to 173° F., wherein the mol ratio of benzene to formaldehyde has a value from 0.5 to 1, and from 1.5% to 15%, by weight, of an epoxy resin having an epoxide equivalent of 175 to 2,000, wherein the weight ratio of infusible resin to epoxy resin is from 10:1 to 5:1, wherein said epoxy resin is of the formula:

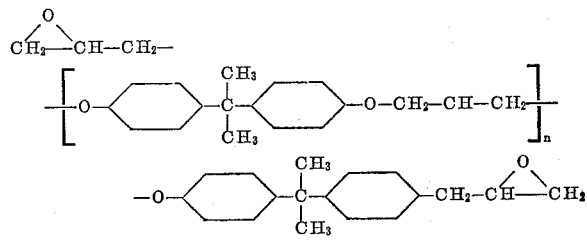

wherein n is a number from 0 to 10 such that the average molecular weight of said epoxy resin is from 350 to 1,000.

10. A grease composition comprising a major proportion of an oil of lubricating viscosity, from about 10% to about 30%, by weight, of a benzene-formaldehyde infusible resin obtained by the reaction of benzene with formaldehyde in the presence of an acid catalyst at temperatures from 35° F. to about 173° F., wherein the mol ratio of benzene to formaldehyde has a value from 0.5 to 4, and from 1.5% to 15%, by weight, of an epoxy resin having an epoxide equivalent of 175 to 2,000, wherein the weight ratio of infusible resin to epoxy resin is from 10:1 to 5:1 and wherein said epoxy resin is of the formula:

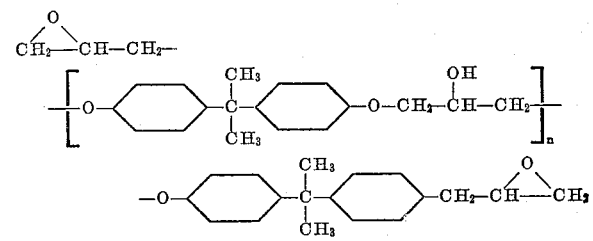

wherein n is a number from 0 to 10 such that the epoxy resin has an average molecular weight of 350 to 1,000.

11. A grease composition comprising a major proportion of an oil lubricating viscosity, and from about 10% to about 30%, by weight, of a benzene-formaldehyde infusible resin obtained by the reaction of benzene with formaldehyde in the presence of an acid catalyst at temperatures from 35° F. to about 55° F., wherein the mol ratio of benzene to formaldehyde has a value from 0.5 to 4, and from 1.5% to 15%, by weight, of an epoxy resin having an epoxide equivalent of 175 to 2,000, wherein the weight ratio of infusible resin to epoxy resin is from 10:1 to 5:1 and wherein said epoxy resin has the formula:

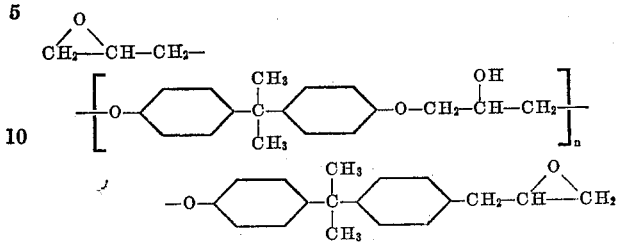

wherein n is a number from 0 to 10 such that the epoxy resin has an average molecular weight from 350 to 1,000.

12. A grease composition comprising a major proportion of an oil of lubricating viscosity, a minor proportion of a metal-containing grease thickening agent, in combination therewith, from 10%, by weight, to about 30%, by weight, of an aromatic hydrocarbon-formaldehyde infusible resin grease thickening agent obtained by the reaction of an aromatic hydrocarbon and formaldehyde in the presence of an acid catalyst at temperatures from 35° to 173° F. wherin the mol ratio of aromatic hydrocarbon to formaldehyde has a value from about 0.5 to 4, and from 1.5% to 15%, by weight, of an epoxy resin having an epoxide equivalent of 175 to 2,000, wherein the weight ratio of infusible resin to epoxy resin is from 10:1 to 5:1 and wherein said epoxy resin has the formula:

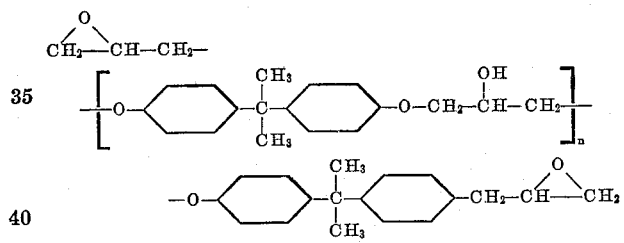

wherein n is a number from 0 to 10 such that the average molecular weight of said epoxy resin is from 350 to 1,000.

13. The grease composition of claim 12, wherein the aromatic hydrocarbon is toluene.

14. The grease composition of claim 12, wherein the aromatic hydrocarbon is a xylene.

15. The grease composition of claim 12, wherein the aromatic hydrocarbon is of the formula:

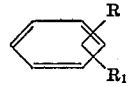

wherein R is selected from the group consisting of hydrogen and alkyl radicals containing no more than 6 carbon atoms, and $R_1$ is selected from the group consisting of hydrogen, an alkyl radical containing no more than 6 carbon atoms, a phenyl radical, and an alkylphenyl radical.

References Cited in the file of this patent

UNITED STATES PATENTS

| | | |
|---|---|---|
| 2,412,589 | Lieber | Dec. 17, 1946 |
| 2,612,474 | Morgan et al. | Sept. 30, 1952 |
| 2687,377 | Stewart et al. | Aug. 24, 1954 |
| 2,734,032 | Coppock | Feb. 7, 1956 |
| 2,842,497 | Watson | July 8, 1958 |